United States Patent
Li et al.

(10) Patent No.: US 12,486,056 B2
(45) Date of Patent: Dec. 2, 2025

(54) HIGH-SPEED FILLING AND PLUGGING SYSTEM AND FILLING AND PLUGGING METHOD THEREOF

(71) Applicant: TRUKING TECHNOLOGY LIMITED, Hunan (CN)

(72) Inventors: Kang Li, Hunan (CN); Xinhua Li, Hunan (CN); Minyi Xu, Hunan (CN); Bo Yi, Hunan (CN); Zhiwen Wang, Hunan (CN)

(73) Assignee: TRUKING TECHNOLOGY LIMITED, Hunan (CN)

( * ) Notice: Subject to any disclaimer, the term of this patent is extended or adjusted under 35 U.S.C. 154(b) by 112 days.

(21) Appl. No.: 18/268,309

(22) PCT Filed: Dec. 24, 2021

(86) PCT No.: PCT/CN2021/141147
§ 371 (c)(1),
(2) Date: Dec. 3, 2024

(87) PCT Pub. No.: WO2022/143448
PCT Pub. Date: Jul. 7, 2022

(65) Prior Publication Data
US 2025/0326507 A1  Oct. 23, 2025

(30) Foreign Application Priority Data
Dec. 31, 2020  (CN) .......................... 202011639655.5

(51) Int. Cl.
*B65B 3/00* (2006.01)
*B65B 3/04* (2006.01)
(Continued)

(52) U.S. Cl.
CPC ................ *B65B 3/003* (2013.01); *B65B 3/04* (2013.01); *B65B 7/2807* (2013.01);
(Continued)

(58) Field of Classification Search
CPC ......... B65B 3/003; B65B 3/04; B65B 7/2821; B65B 7/2807; B65B 25/001; B65B 65/02
See application file for complete search history.

(56) References Cited

U.S. PATENT DOCUMENTS

| 6,202,278 B1 | 3/2001 | Nakayama et al. |
| 7,937,907 B2 * | 5/2011 | Fleckenstein ........... B65B 3/003 53/287 |

(Continued)

FOREIGN PATENT DOCUMENTS

| CN | 2696989 | 5/2005 |
| CN | 2820826 | 9/2006 |

(Continued)

OTHER PUBLICATIONS

"International Search Report (Form PCT/ISA/210) of PCT/CN2021/141147", mailed on Mar. 22, 2022, with English translation thereof, pp. 1-6.

(Continued)

*Primary Examiner* — Thomas M Wittenschlaeger
(74) *Attorney, Agent, or Firm* — JCIPRNET

(57) ABSTRACT

A system for high-speed filling and plugging, includes a conveying device, a plug delivering device, a filling device, a first plugging device, a second plugging device and a rubber plug transport device which is used for transferring a rubber plug to the first plugging device and the second plugging device. The filling device, the first plugging device, the second plugging device, the rubber plug transport device and the plug delivering device are sequentially arranged along the conveying device. The rubber plug transport device includes a first plugging plate provided with a first rubber plug positioning channel, a second plugging plate provided with a second rubber plug positioning channel, and an eccentric shaft assembly used for driving the first plugging plate and second plugging plate to rotate so as to adjust the distance between the first rubber plug positioning channel and the second rubber plug positioning channel.

11 Claims, 5 Drawing Sheets

(51) Int. Cl.
  *B65B 7/28* (2006.01)
  *B65B 25/00* (2006.01)
  *B65B 65/02* (2006.01)

(52) U.S. Cl.
  CPC .......... *B65B 7/2821* (2013.01); *B65B 25/001* (2013.01); *B65B 65/02* (2013.01)

(56) References Cited

U.S. PATENT DOCUMENTS

| | | | | |
|---|---|---|---|---|
| 11,186,390 | B2* | 11/2021 | Broadbent | B65B 7/161 |
| 2013/0174520 | A1* | 7/2013 | Tessier | B65B 3/003 |
| | | | | 141/387 |
| 2017/0081056 | A1* | 3/2017 | Zambaux | A61M 5/30 |

FOREIGN PATENT DOCUMENTS

| | | |
|---|---|---|
| CN | 1865122 | 11/2006 |
| CN | 103832953 | 6/2014 |
| CN | 104310295 | 1/2015 |
| CN | 106864791 | 6/2017 |
| CN | 112678230 | 4/2021 |
| CN | 112794256 | 5/2021 |
| CN | 214268060 | 9/2021 |
| CN | 214268061 | 9/2021 |
| CN | 214456682 | 10/2021 |

OTHER PUBLICATIONS

"Written Opinion of the International Searching Authority (Form PCT/ISA/237) of PCT/ CN2021/141147", mailed on Mar. 22, 2022, pp. 1-5.

* cited by examiner

HIGH-SPEED FILLING AND PLUGGING SYSTEM AND FILLING AND PLUGGING METHOD THEREOF

CROSS-REFERENCE OF RELEVANT APPLICATION

This application is a 371 of international application of PCT application serial no. PCT/CN2021/141147, filed on Dec. 24, 2021, which claims the priority benefit of Chinese Patent Application No. 202011639655.5, filed on Dec. 31, 2020. The entirety of each of the above-mentioned patent applications is hereby incorporated by reference herein and made a part of this specification.

BACKGROUND OF THE INVENTION

Technical Field

The invention relates to food and drug packaging devices and methods, in particular to a high-speed filling and plugging system and method.

Description of Related Art

According to an existing filling and plugging system, a filling device and a plugging device are fixed on one side of a container conveying device, and containers are filled by the filling device and are then plugged by the plugging device. Due to the fact the plugging time is shorter than the filling time, after a first row of containers is filled by the filling device, the filling device has to wait to fill a second row of containers until the first row of containers is plugged by the plugging device, which compromises the production efficiency of the filling and plugging system. In addition, in some filling and plugging systems, both the filling device and the plugging device need to move in the container conveying direction, and containers to be filled and plugged are conveyed rhythmically in this process; moving mechanisms have to cooperate with each other in the filling and plugging process, accurate positioning and cooperation of the filling device, the plugging device and the containers is needed for filling and plugging, and once a positioning deviation occurs in the container filling and plugging process, the operating stability will not be guaranteed.

BRIEF SUMMARY OF THE INVENTION

Technical Problem to be Settled

The technical issue to be settled by the invention is to overcome the defects in the prior art by providing a high-speed filling and plugging system, which is simple in structure, high in production efficiency and good in operating stability.

A filling and plugging method for the high-speed filling and plugging system is provided in the invention.

Technical Solutions of Problems

Technical Solution to the Technical Problem

To solve the above technical problems, the invention uses the following technical solutions:

A high-speed filling and plugging system, including a conveying device, a plug delivering device, a filling device, a first plugging device, a second plugging device, and a rubber plug transport device used for transferring rubber plugs to the first plugging device and the second plugging device, wherein the filling device, the first plugging device, the second plugging device, the rubber plug transport device and the plug feeding device are sequentially arranged in a conveying direction of the conveying device, the rubber plug transport device includes a first plugging plate provided with a first rubber plug positioning channel, a second plugging plate provided with a second rubber plug positioning channel, and an eccentric shaft assembly used for driving the first plugging plate and the second plugging plate to rotate to adjust a distance between the first rubber plug positioning channel and the second rubber plug positioning channel, and top plug components are disposed below the plug delivering device.

As a further improvement to the above technical solution:

The eccentric shaft assembly includes a first rotating shaft and a second rotating shaft which are arranged eccentrically, the first rotating shaft is connected to the first plugging plate, the second rotating shaft is connected to the second plugging plate, the first rotating shaft is a hollow shaft, and the second rotating shaft is disposed in the first rotating shaft; or, the second rotating shaft is a hollow shaft, and the first rotating shaft is disposed in the second rotating shaft.

The rubber plug transport device further includes a driving shaft, first connecting rods are disposed on the driving shaft and the second rotating shaft, second connecting rods are hinged to two ends of the first connecting rod on the driving shaft, ends of the second connecting rods, ends of the first connecting rod on the second rotating shaft and the first rotating shaft are hinged together, and the first connecting rods and the two second connecting rods form a parallelogram link mechanism; or, First connecting rods are disposed on the driving shaft and the first rotating shaft, second connecting rods are hinged to two ends of the first connecting rod on the driving shaft; ends of the second connecting rods, ends of the first connecting rod on the first rotating shaft and the second rotating shaft are hinged together, the two first connecting rods and the two second connecting rods form a parallelogram link mechanism.

A connecting pin is disposed between the first plugging plate and the second plugging plate, an elastic element is disposed around the connecting pin, and two ends of the elastic element abut against the first plugging plate and the second plugging plate respectively.

The high-speed filling and plugging system further including a protective cover, the connecting pin and the elastic element are disposed in the protective cover.

The eccentric shaft assembly includes a first rotating shaft and a second rotating shaft which are arranged eccentrically, the first rotating shaft is connected to the first plugging plate, the second rotating shaft is connected to the second plugging plate, and the first rotating shaft and/or the second rotating shaft are/is disposed on a sliding mechanism.

The top plug components include a first top plug component corresponding to the first rubber plug positioning channel and a second top plug component corresponding to the second rubber plug positioning channel.

The filling device includes a filling needle holder capable of reciprocating in the conveying direction of the conveying device and a filling needle disposed on the filling needle holder.

A filling and plugging method for the high-speed filling and plugging system mentioned above, including:

S1: conveying containers by the conveying device;

S2: filling the containers by the filling device; and

S3: after two or more rows of containers are filled by the filling device, plugging the front row of containers by the second plugging device, and plugging the back row of containers by the first plugging device.

As a further improvement to the above technical solution: In the step S2, the filling device moves along the conveying device to fill subsequent rows of containers.

The step S3 specifically includes:

S3.1: driving, by the first rotating shaft, the first plugging plate to rotate to allow the first rubber plug positioning channel to move to be located above the first top plug component, and driving, by the second rotating shaft, the second plugging plate to rotate to allow the second rubber plug positioning channel to move to be located above the second top plug component, such that the first rubber plug positioning channel and the second rubber plug positioning channel are close to each other;

S3.2: ejecting, by the first top plug component one rubber plug into the first rubber plug positioning channel, and ejecting, by the second top plug component, another rubber plug into the second rubber plug positioning channel;

S3.3: driving, by the first rotating shaft, the first plugging plate to rotate to allow the first rubber plug positioning channel to rotate to be located below the first plugging device, and driving, by the second rotating shaft, the second plugging plate to rotate to allow the second rubber plug positioning channel to move to be located below the second plugging device, such that the first rubber plug positioning channel and the second rubber plug positioning channel are separated; and S3.4: pressing, by the first plugging device and the second plugging device, the rubber plugs into the containers.

BENEFICIAL EFFECT OF THE INVENTION

Beneficial Effect

Compared with the prior art, the invention has the following advantages: the high-speed filling and plugging system is provided with the first plugging device and the second plugging device, such that two rows of containers can be plugged at the same time to improve the plugging efficiency, thus improving the production efficiency of the system; the rubber plug transport device can rapidly and accurately transfer two rows of rubber plugs from the plug delivering device to positions below the first plugging device and the second plugging device at the same time, the filling device, the first plugging device and the second plugging device of the system do not need to move along the conveying device, and the conveying device only drives the containers move intermittently or rhythmically, such that the filling device, the plugging devices and the containers can be aligned accurately, and stable operation of the system is guaranteed.

According to the filling and plugging method used for the high-speed filling and plugging system, after two or more rows of containers are filled by the filling device, the front row of containers is plugged by the second plugging device, and the back row of containers is plugged by the first plugging device, such that the production efficiency of the system is improved.

BRIEF DESCRIPTION OF THE SEVERAL VIEWS OF THE DRAWINGS

Description of the Drawings

Figure 1:
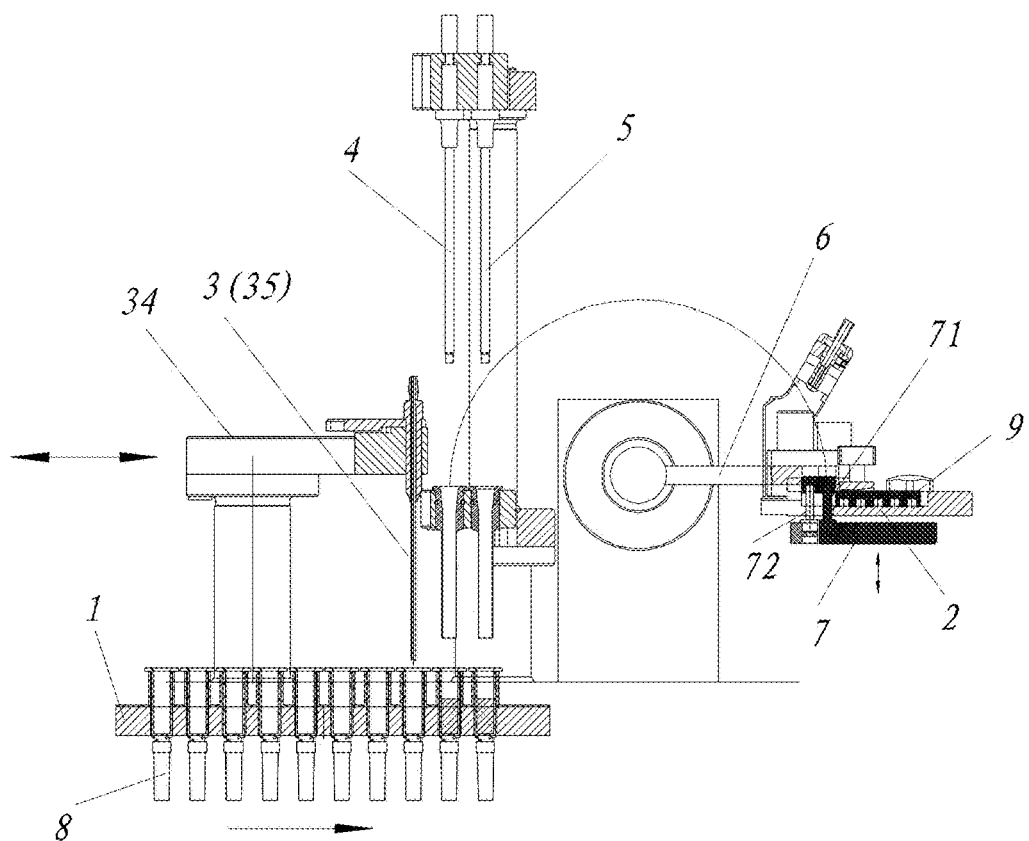

FIG. 1 is a structural diagram of a high-speed filling and plugging system after plug feeding according to the invention.

Figure 2:
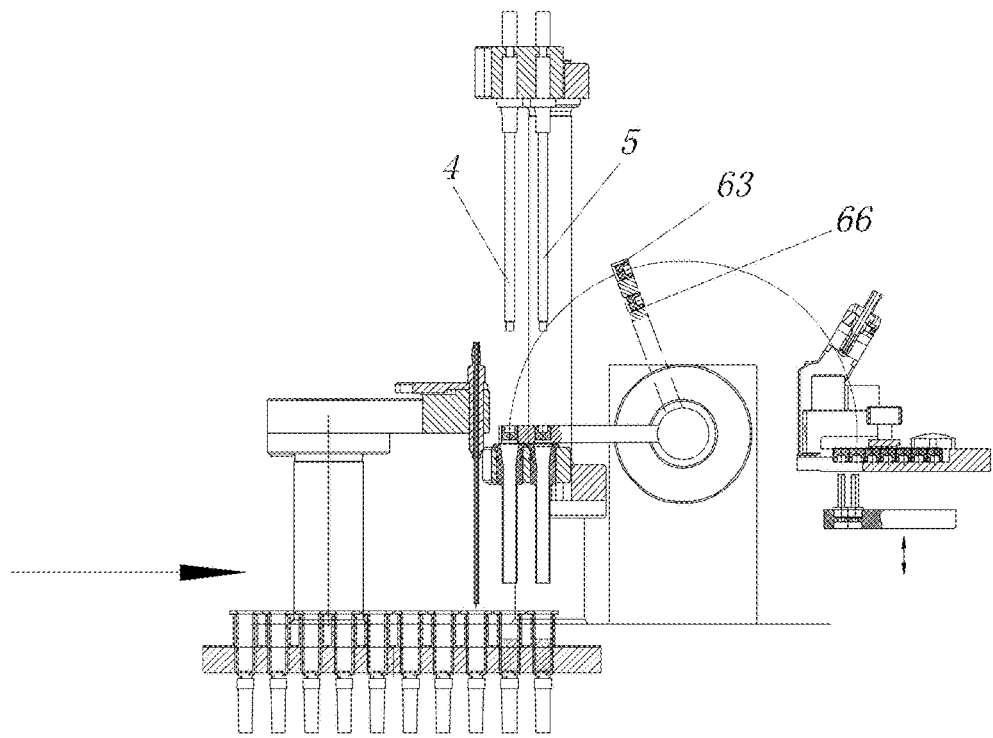

FIG. 2 is a structural diagram of high-speed filling and plugging system during rubber plate transferring according to the invention.

Figure 3:
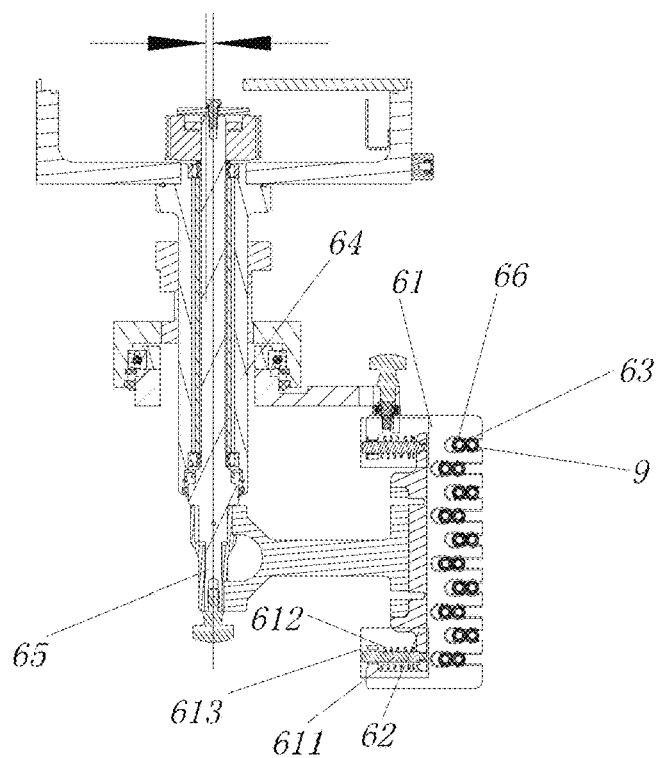

FIG. 3 is a structural diagram of a rubber plug transport device after plug feeding according to Embodiment 1 of the invention.

Figure 4:
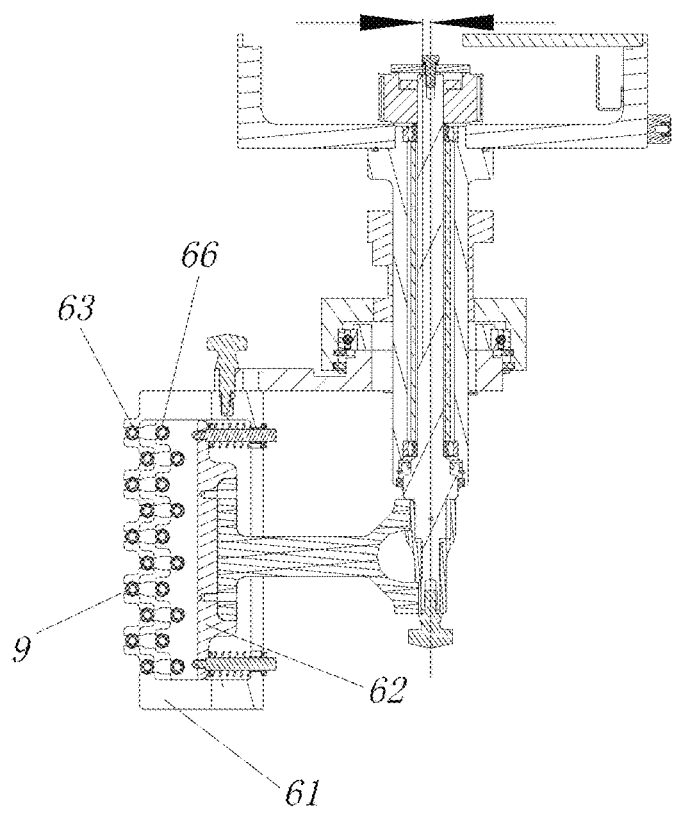

FIG. 4 is a structural diagram of the rubber plug transport device waiting for plugging according to Embodiment 1 of the invention.

Figure 5:
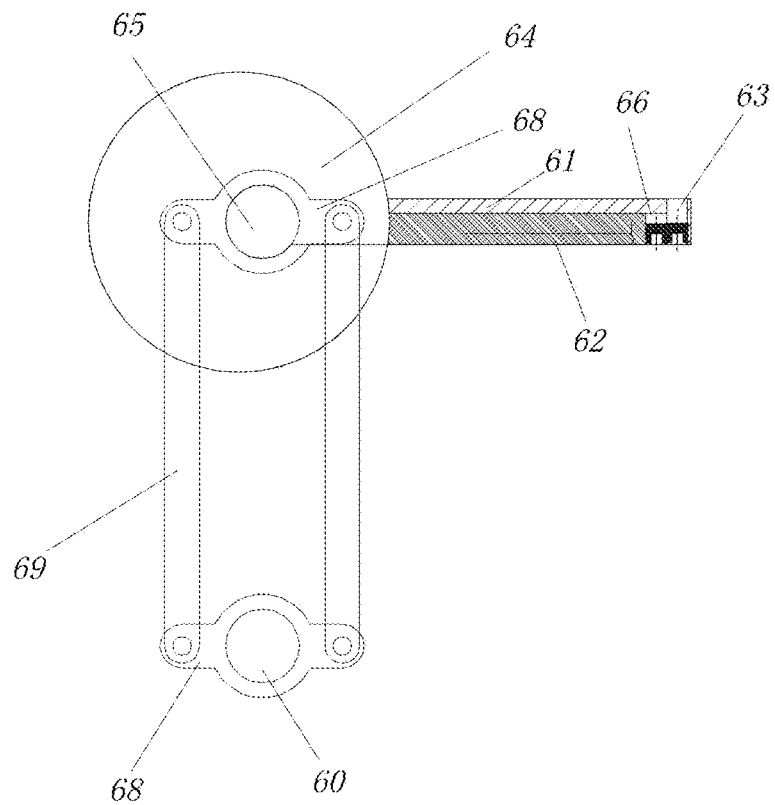

FIG. 5 is a schematic diagram of the rubber plug transport device after plug feeding according to Embodiment 1 of the invention.

Figure 6:
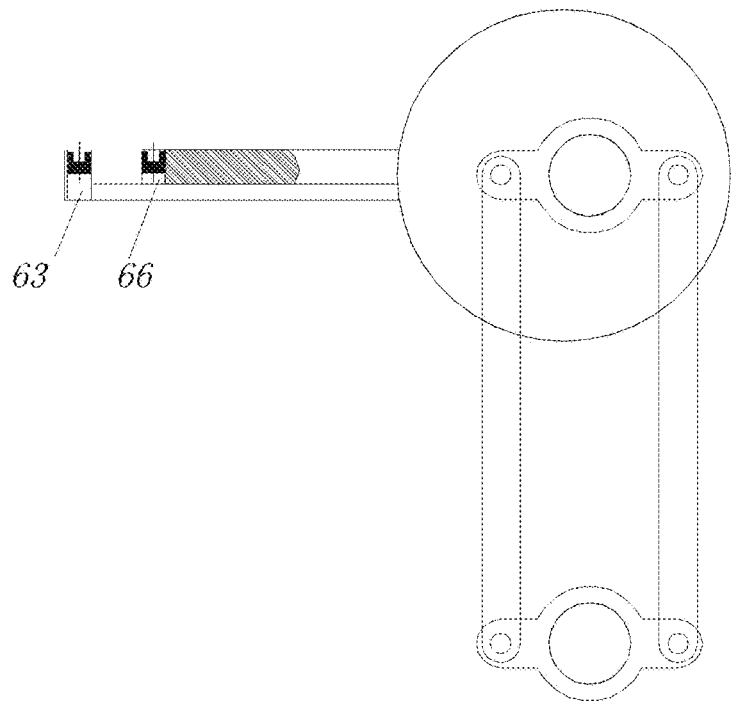

FIG. 6 is a structural diagram of the rubber plug transport device waiting for plugging according to Embodiment 2 of the invention.

Figure 7:
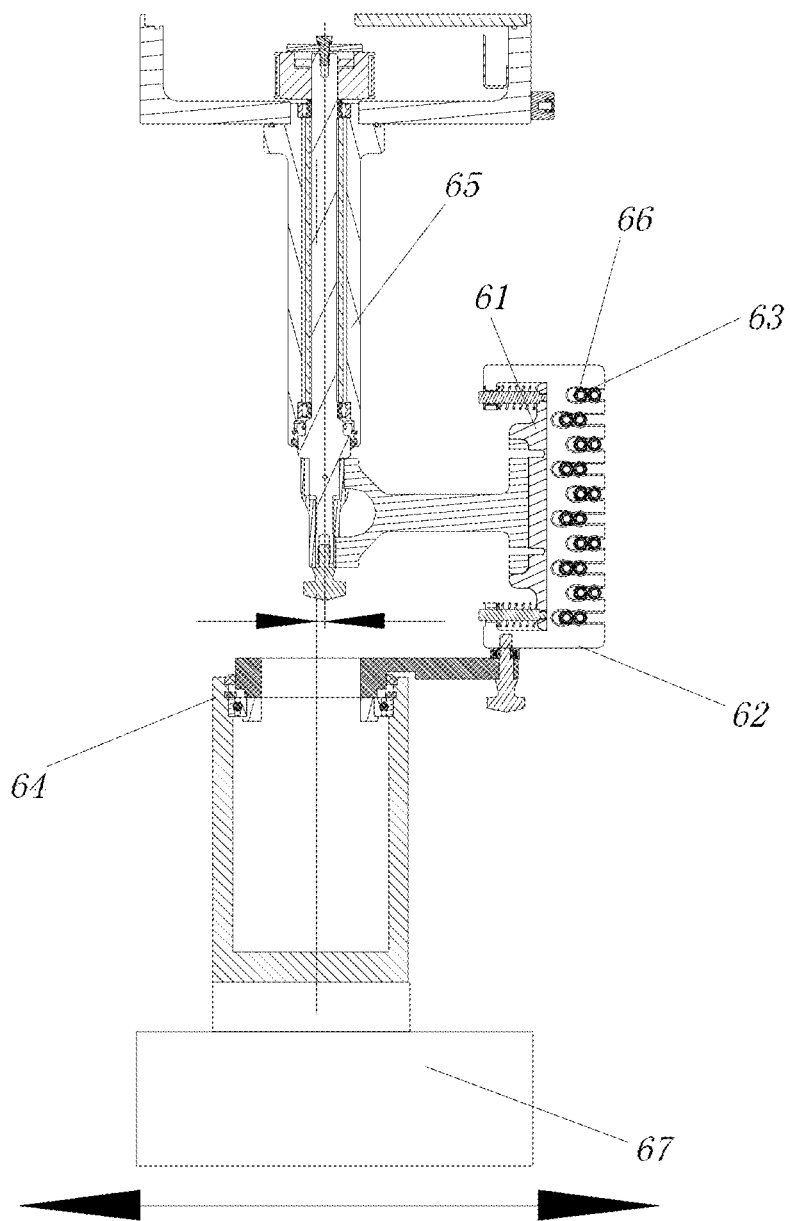

FIG. 7 is a schematic diagram of the rubber plug transport device after plug feeding according to Embodiment 2 of the invention.

Figure 8:
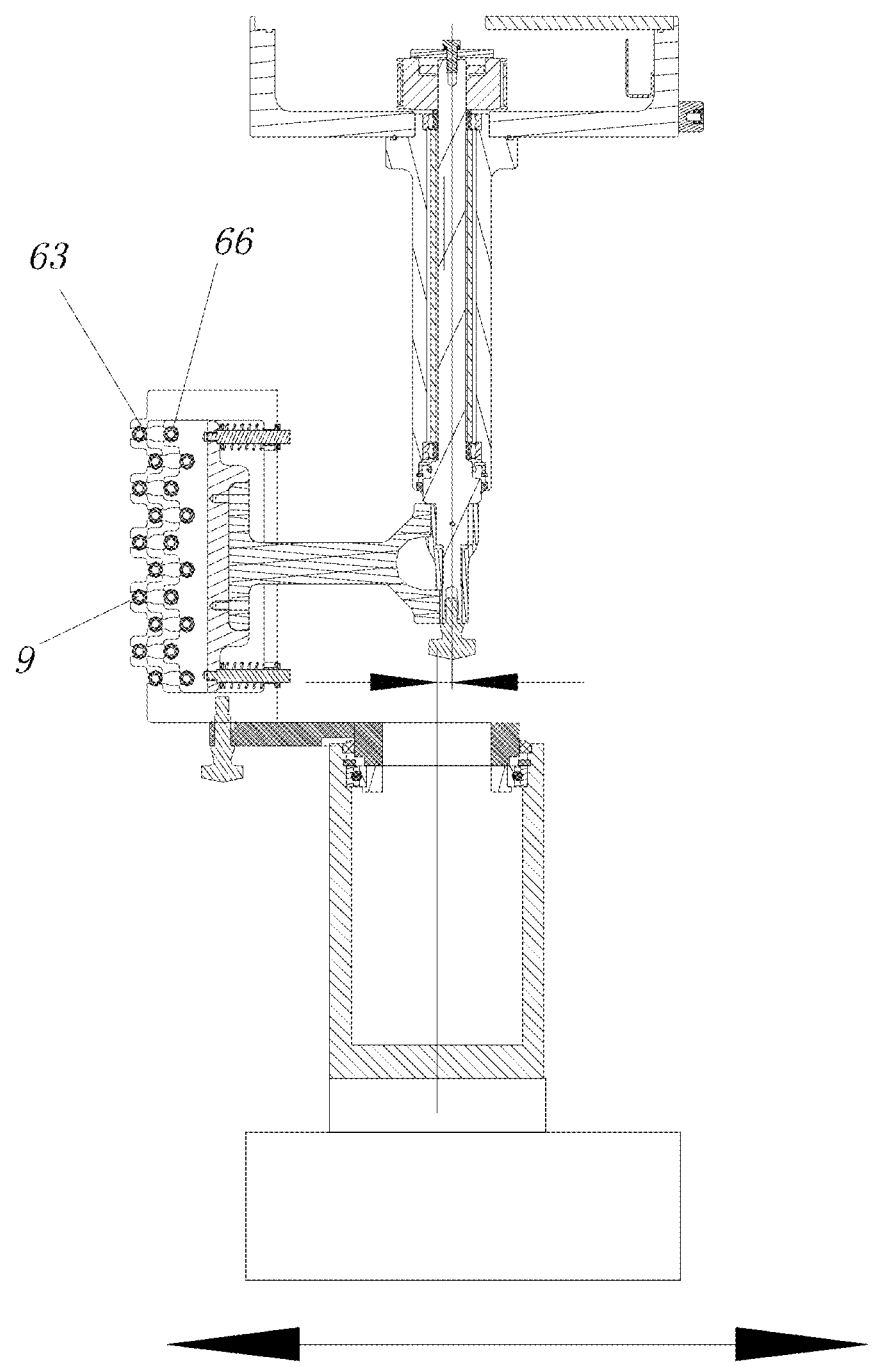

FIG. 8 is a structural diagram of the rubber plug transport device waiting for plugging according to Embodiment 2 of the invention.

DETAILED DESCRIPTION OF THE INVENTION

The invention will be described in further detail below in conjunction with accompanying drawings and specific embodiments.

Embodiment 1

FIG. 1-FIG. 6 illustrate one embodiment of a high-speed filling and plugging system provided by the invention. In this embodiment, the high-speed filling and plugging system includes a conveying device 1, a plug delivering device 2, a filling device 3, a first plugging device 4, a second plugging device 5, and a rubber plug transport device 6 used for transferring rubber plugs 9 to the first plugging device 4 and the second plugging device 5, wherein the filling device 3, the first plugging device 4, the second plugging device 5, the rubber plug transport device 6 and the plug delivering device 2 are sequentially arranged along the conveying device 1, the rubber plug transport device 6 includes a first plugging plate 61 provided with a first rubber plug positioning channel 63, a second plugging plate 62 provided with a second rubber plug positioning channel 66, and an eccentric shaft assembly used for driving the first plugging plate 61 and the second plugging plate 62 to rotate to adjust the distance between the first rubber plug positioning channel 63 and the second rubber plug positioning channel 66, the first rubber plug positioning channel 63 corresponds to the first plugging device 4, the second rubber plug positioning device 66 corresponds to the second plugging device 5, and top plug components 7 are disposed below the plug delivering device 2.

The high-speed filling and plugging system is provided with the first plugging device 4 and the second plugging device 5, such that two rows of containers 8 can be plugged at the same time to improve the plugging efficiency, thus improving the production efficiency of the system; the rubber plug transport device 6 can rapidly and accurately transfer two rows of rubber plugs 9 from the plug delivering device 2 to positions below the first plugging device and the second plugging device 5 at the same time, the filling device 3, the first plugging device 4 and the second plugging device 5 of the system do not need to move along the conveying device 1, and the conveying device 1 only drives the containers 8 move intermittently or rhythmically, such that the filling device 3, the plugging devices and the containers 8 can be aligned accurately, and stable operation of the system is guaranteed.

Further, in this embodiment, the eccentric shaft assembly includes a first rotating shaft 64 and a second rotating shaft 65 which are arranged eccentrically, the first rotating shaft 64 is connected to the first plugging plate 61, the second rotating shaft 65 is connected to the second plugging plate 62, the first rotating shaft 64 is a hollow shaft, and the second rotating shaft 65 is disposed in the first rotating shaft 64. The first rotating shaft 64 drives the first plugging plate 61 to rotate, the second rotating shaft 65 drives the second plugging plate 62 to rotate, and the two rotating shafts are arranged eccentrically, so the distance between the first rubber plug positioning channel 63 and the second rubber plug positioning channel 66 increases and decreases periodically; when the first rubber plug positioning channel 63 and the second rubber plug positioning channel 66 are close to each other, plugs can be fed; and when the first rubber plug positioning channel 63 and the second rubber plug positioning channel 66 are separated from each other, containers can be plugged by the first plugging device 4 and the second plugging device 5. The eccentric shaft assembly is compact in overall structure and occupies a small space. Of course, in other embodiments, the second rotating shaft 65 may be a hollow shaft, the first rotating shaft 64 is disposed in the second rotating shaft 65, and in this case, the purpose of the invention can also be realized.

Further, in this embodiment, the rubber plug transport device 6 further includes a driving shaft 60, first connecting rods 68 are disposed on the driving shaft 60 and the second rotating shaft 65, second connecting rods 69 are hinged to two ends of the first connecting rod 68 on the driving shaft 60, ends of the second connecting rods 69, ends of the first connecting rod 68 on the second rotating shaft 65 and the first rotating shaft 64 are hinged together, and the two first connecting rods 68 and the two second connecting rods 69 form a parallelogram link mechanism. Synchronous rotation of the first rotating shaft 64 and the second rotating shaft 65 which are arranged eccentrically can be realized through the driving shaft 60 and the parallelogram link mechanism, such that the number of driving components is reduced, the structure is simplified, and the cost is reduced. Of course, in other embodiments, if the second rotating shaft 65 is a hollow shaft and the first rotating shaft 64 is disposed in the second rotating shaft 65, first connecting rods 68 are disposed on the driving shaft 60 and the first rotating shaft 64 correspondingly, second connecting rods 69 are hinged to two ends of the first connecting rod 68 on the driving shaft 60, ends of the second connecting rods 69, ends of the first connecting rod 68 on the first rotating shaft 64 and the second rotating shaft 65 are hinged together, the two first connecting rods 68 and the two second connecting rods 69 form a parallelogram link mechanism, and in this way, the purpose of the invention can also be realized.

Further, in this embodiment, a connecting pin 611 is disposed between the first plugging plate 61 and the second plugging plate 62, an elastic element 612 is disposed around the connecting pin 611, and two ends of the elastic element 612 abut against the first plugging plate 61 and the second plugging plate 62 respectively. Because only one rotatory driving component is arranged, the connecting pin 611 is arranged to transfer rotational driving force between the first plugging plate 61 and the second plugging plate 62, and the elastic element 612 is disposed around the connecting pin 611 to realize flexible connection between the first plugging plate 61 and the second plugging plate 62, such that stable and smooth rotation is guaranteed, and the structure is simple and reliable. Preferably, the connecting pin 611 and the elastic element 612 may be disposed in a protective cover 613 to prevent the clean environment of the system from being contaminated by particles caused by friction between the connecting pin 611 and the elastic element 612.

Further, in this embodiment, the top plug components 7 include a first top plug component 71 corresponding to the first rubber plug positioning channel 63 and a second top plug component 72 corresponding to the second rubber plug positioning channel 66. The first top plug component 71 and the second top plug component 72 eject plugs synchronously to increase the plug feeding speed, thus further improving the efficiency.

As a preferred technical solution, in this embodiment, because the rubber plug transport device 6 can accurately convey the rubber plugs 9 to positions below the first plugging device 4 and the second plugging device 5, the first plugging device 4 and the second plugging device 5 just need to move upwards and downwards and do not need to move along the conveying device 1, which guarantees accurate positioning and cooperation of the first plugging device 4, the second plugging device 5 and the containers 8.

As a preferred technical solution, in this embodiment, the filling device 3 includes a filling needle holder 34 capable of reciprocating in the conveying direction of the conveying device 1 and a filling needle 35 disposed on the filling needle holder 34, that is, the filling needle holder 34 drives the filling needle 35 to reciprocate along the conveying device 1, and when the containers 8 are plugged by the plugging devices, the filling device 3 can fill subsequent rows of containers 8, such that the production efficiency of the system is further improved. Of course, in other embodiments, only the filling needle 35 of the filling device 3 moves upwards and downwards, and the filling needle holder 34 does not move, such that accurate positioning and cooperation of the filling device 3 and the containers 8 can be guaranteed.

Embodiment 2

FIG. 7-FIG. 8 illustrate another embodiment of the high-speed filling and plugging system of the invention. The high-speed filling and plugging system in this embodiment is basically identical with the high-speed filling and plugging system in Embodiment 1, and differs from the high-speed filling and plugging system in Embodiment 1 in the following aspects: in this embodiment, the eccentric shaft assembly includes a first rotating shaft 64 and a second rotating shaft 65 which are arranged eccentrically, the first rotating shaft 64 is connected to the first plugging plate 61, the second rotating shaft 65 is connected to the second plugging plate 62, the first rotating shaft 64 is disposed on a sliding mechanism 67, that is, the eccentric distance between the first rotating shaft 64 and the second rotating shaft 65 can be adjusted through the sliding mechanism 67 to adapt to filling and plugging of containers of different specifications; however, this structure has the defects that the equipment size is increased and a large area of a plant is occupied. Of course, in other embodiments, the second rotating shaft 65 is disposed on a sliding mechanism 67; or the first rotating shaft 64 is disposed on a sliding mechanism 67 and the second rotating shaft 65 is disposed on a sliding mechanism 67.

A filling and plugging method of the filling and plugging system in this embodiment includes the following steps:

S1: conveying containers 8 by the conveying device 1;

S2: filling the containers 8 by the filling device 3; and

S3: after two or more rows of containers 8 are filled by the filling device 3, plugging the front row of containers 8 by the second plugging device 5, and plugging the back row of containers 8 by the first plugging device 4.

By adopting the filling and plugging method, after two or more rows of containers 8 are filled by the filling device 3, the front row of containers 8 is plugged by the second plugging device 5, and the back row of containers 8 is plugged by the first plugging device 4, such that the production efficiency of the system is improved.

Further, in this embodiment, in S2, the filling needle holder 34 drives the filling needle 35 to reciprocate in the conveying direction of the conveying device 1 to fill subsequent rows of containers 8, such that the production efficiency of the system is further improved.

Further, in this embodiment, the step S3 specifically includes:

S3.1: driving, by the first rotating shaft 64, the first plugging plate 61 to rotate to allow the first rubber plug positioning channel 63 to move to be located above the first top plug component 71, and driving, by the second rotating shaft 65, the second plugging plate 62 to rotate to allow the second rubber plug positioning channel 66 to move to be located above the second top plug component 72, such that the first rubber plug positioning channel 63 and the second rubber plug positioning channel 66 are closed to each other;

S3.2: ejecting, by the first top plug component 71, one rubber plug 9 into the first rubber plug positioning channel 63, and ejecting, by the second top plug component 72, another rubber plug 9 into the second rubber plug positioning channel 66;

S3.3: driving, by the first rotating shaft 64, the first plugging plate 61 to rotate to allow the first rubber plug positioning channel 63 to rotate to be located below the first plugging device 4, and driving, by the second rotating shaft 65, the second plugging plate 62 to rotate to allow the second rubber plug positioning channel 66 to move to be located below the second plugging device 5, such that the first rubber plug positioning channel 63 and the second rubber plug positioning channel 66 are separated; and S3.4: pressing, by the first plugging device 4 and the second plugging device 5, the rubber plugs 9 into the containers 8. The automation degree of this step is high, two rows of rubber plugs 9 can be rapidly and accurately transferred to positions below the first plugging device 4 and the second plugging device 5 at the same time, and the first top plug component 71 and the second top plug component 72 just need to move upward and downward and do not need to move along the conveying device 1, such that the rubber plugs 9 can enter the rubber plug positioning channels more efficiently.

Although the invention is described above with reference to preferred embodiments, these embodiments are not used for limit the invention. Any skilled in the art can make many possible modifications and embellishments to the technical solutions of the invention or amend the above embodiments into equivalent embodiments according to the technical contents disclosed above. Therefore, any simple amendments, equivalent modifications and embellishments made to the above embodiments according to the technical essence of the invention, without departing from the technical solutions of the invention should fall within the protection scope of the invention.

What is claimed is:

1. A high-speed filling and plugging system, comprising a conveying device, a plug delivering device, a filling device, a first plugging device, a second plugging device, and a rubber plug transport device used for transferring rubber plugs to the first plugging device and the second plugging device, wherein the filling device, the first plugging device, the second plugging device, the rubber plug transport device and the plug delivering device are sequentially arranged in a conveying direction of the conveying device, the rubber plug transport device comprises a first plugging plate provided with a first rubber plug positioning channel, a second plugging plate provided with a second rubber plug positioning channel, and an eccentric shaft assembly used for driving the first plugging plate and the second plugging plate to rotate to adjust a distance between the first rubber plug positioning channel and the second rubber plug positioning channel, and top plug components are disposed below the plug delivering device.

2. The high-speed filling and plugging system as recited in claim 1, wherein the eccentric shaft assembly comprises a first rotating shaft and a second rotating shaft which are arranged eccentrically, the first rotating shaft is connected to the first plugging plate, the second rotating shaft is connected to the second plugging plate, the first rotating shaft is a hollow shaft, and the second rotating shaft is disposed in the first rotating shaft; or, the second rotating shaft is a hollow shaft, and the first rotating shaft is disposed in the second rotating shaft.

3. The high-speed filling and plugging system as recited in claim 2, wherein the rubber plug transport device further comprises a driving shaft, two first connecting rods are respectively disposed on the driving shaft and the second rotating shaft, two second connecting rods are hinged to two ends of the first connecting rod on the driving shaft, ends of the second connecting rods, ends of the first connecting rod on the second rotating shaft and the first rotating shaft are hinged together, and the two first connecting rods and the two second connecting rods form a parallelogram link mechanism; or, the rubber plug transport device further comprises a driving shaft, two first connecting rods are respectively disposed on the driving shaft and the first rotating shaft, second connecting rods are hinged to two ends of the first connecting rod on the driving shaft; ends of the second connecting rods, ends of the first connecting rod on the first rotating shaft and the second rotating shaft are hinged together, the two first connecting rods and the two second connecting rods form a parallelogram link mechanism.

4. The high-speed filling and plugging system as recited in claim 3, wherein a connecting pin is disposed between the first plugging plate and the second plugging plate, an elastic element is disposed around the connecting pin, and two ends of the elastic element abut against the first plugging plate and the second plugging plate respectively.

5. The high-speed filling and plugging system as recited in claim 4, wherein the high-speed filling and plugging device further comprising a protective cover, wherein the connecting pin and the elastic element are disposed in the protective cover.

6. The high-speed filling and plugging system as recited in claim 1, wherein the eccentric shaft assembly comprises a first rotating shaft and a second rotating shaft which are arranged eccentrically, the first rotating shaft is connected to the first plugging plate, the second rotating shaft is connected to the second plugging plate, and the first rotating shaft and/or the second rotating shaft are/is disposed on a sliding mechanism.

7. The high-speed filling and plugging system as recited in claim 1, wherein the top plug components comprise a first top plug component corresponding to the first rubber plug positioning channel and a second top plug component corresponding to the second rubber plug positioning channel.

8. The high-speed filling and plugging system as recited in claim 1, wherein the filling device comprises a filling needle holder capable of reciprocating in the conveying direction of the conveying device and a filling needle disposed on the filling needle holder.

9. A filling and plugging method for the high-speed filling and plugging system as recited in claim 1 comprising:
   S1: conveying containers by the conveying device;
   S2: filling the containers by the filling device; and
   S3: after two or more rows of the containers are filled by the filling device, plugging a front row of the two or more rows of the containers by the second plugging device, and plugging a back row of the two or more rows of the containers by the first plugging device.

10. The filling and plugging method as recited in claim 9, wherein in step S2, the filling device moves along the conveying device to fill subsequent rows of the two or more rows of the containers.

11. The filling and plugging method as recited in claim 9, the step S3 comprises:

S3.1: driving, by a first rotating shaft, the first plugging plate to rotate to allow the first rubber plug positioning channel to move to be located above a first top plug component, and driving, by a second rotating shaft, the second plugging plate to rotate to allow the second rubber plug positioning channel to move to be located above a second top plug component, such that the first rubber plug positioning channel and the second rubber plug positioning channel are close to each other;

S3.2: ejecting, by the first top plug component one rubber plug of the rubber plugs into the first rubber plug positioning channel, and ejecting, by the second top plug component, another rubber plug of the rubber plugs into the second rubber plug positioning channel;

S3.3: driving, by the first rotating shaft, the first plugging plate to rotate to allow the first rubber plug positioning channel to rotate to be located below the first plugging device, and driving, by the second rotating shaft, the second plugging plate to rotate to allow the second rubber plug positioning channel to move to be located below the second plugging device, such that the first rubber plug positioning channel and the second rubber plug positioning channel are separated; and S3.4: pressing, by the first plugging device and the second plugging device, the rubber plugs under the first plugging device and the second plugging device into the containers respectively.

\* \* \* \* \*